United States Patent
Zevallos (10) Patent No.: US 10,735,990 B2
(45) Date of Patent: Aug. 4, 2020

(54) OVERLOAD CONTROL HANDLING IN CASE OF AN OVERLOAD STATE OF A CHARGING ENTITY

(71) Applicant: NOKIA SOLUTIONS AND NETWORKS OY, Espoo (FI)

(72) Inventor: Cesar Augusto Zevallos, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 148 days.

(21) Appl. No.: 15/780,435

(22) PCT Filed: Dec. 4, 2015

(86) PCT No.: PCT/EP2015/078610
§ 371 (c)(1),
(2) Date: May 31, 2018

(87) PCT Pub. No.: WO2017/092819
PCT Pub. Date: Jun. 8, 2017

(65) Prior Publication Data
US 2018/0359655 A1    Dec. 13, 2018

(51) Int. Cl.
*H04W 28/02* (2009.01)
*H04M 15/00* (2006.01)
(Continued)

(52) U.S. Cl.
CPC ..... *H04W 28/0289* (2013.01); *H04L 12/1407* (2013.01); *H04M 15/43* (2013.01);
(Continued)

(58) Field of Classification Search
CPC ....... H04W 4/24; H04M 15/66; H04M 15/64; H04M 15/00; H04L 12/1407; H04L 12/14; H04L 12/1403
See application file for complete search history.

(56) References Cited

U.S. PATENT DOCUMENTS 9,654,650 B1 *  5/2017  Velusamy ............. H04M 15/88
2011/0051615 A1 *  3/2011  Yu ........................... H04L 12/14
370/252

(Continued)

FOREIGN PATENT DOCUMENTS

EP    2 509 255 A1    10/2012
EP    2 874 347 A1    5/2015
(Continued)

OTHER PUBLICATIONS

Author Unknown, 3GPP TS 32.251 V13.2.0, pp. 1-170, Sep. 2015 (Year: 2015).*
(Continued)

*Primary Examiner* — Christopher M Crutchfield
(74) *Attorney, Agent, or Firm* — Squire Patton Boggs (US) LLP (57) ABSTRACT

The present invention provides apparatuses, methods, and computer program products regarding overload control handling in case of an overload state of a charging entity. The method comprises controlling a charging control session with a charging entity, receiving an overload report from the charging entity, and preventing to send any charging related request messages to the charging entity until a predetermined period has elapsed.

7 Claims, 7 Drawing Sheets

(51) Int. Cl.
    *H04W 4/24*     (2018.01)
    *H04L 12/14*    (2006.01)
    *H04W 88/14*    (2009.01)
    *H04W 88/16*    (2009.01)
    *H04W 92/24*    (2009.01)

(52) U.S. Cl.
    CPC ......... *H04M 15/70* (2013.01); *H04M 15/725* (2013.01); *H04M 15/74* (2013.01); *H04W 4/24* (2013.01); *H04M 15/64* (2013.01); *H04W 88/14* (2013.01); *H04W 88/16* (2013.01); *H04W 92/24* (2013.01)

(56) References Cited

U.S. PATENT DOCUMENTS

| | | | | |
|---|---|---|---|---|
| 2011/0202676 | A1* | 8/2011 | Craig | H04L 45/306 709/238 |
| 2012/0123914 | A1* | 5/2012 | Sharma | H04M 15/00 705/30 |
| 2014/0269275 | A1* | 9/2014 | Jun | H04W 36/22 370/230 |
| 2015/0036504 | A1* | 2/2015 | McMurry | H04L 47/127 370/236 |
| 2016/0165068 | A1* | 6/2016 | Sharma | H04M 15/65 455/406 |
| 2018/0241886 | A1* | 8/2018 | Zevallos | H04L 12/1403 |

FOREIGN PATENT DOCUMENTS

| WO | WO 2009/134265 | A1 | 11/2009 |
|---|---|---|---|
| WO | WO 2014/161780 | A1 | 5/2012 |

OTHER PUBLICATIONS

Author Unknown, 3GPP TR 29.809 V12.0.0, pp. 1-58, Jun. 2014 (Year: 2014).*
J. Korhonen, S. Donovan and L. Morand, Diameter Overload Indication Conveyance, RFC 7683, Oct. 2015, pp. 1-42 (Year: 2015).*
Author Unknown, DP on alternative solution of Diameter Overload Control for Diameter charging applications, S5-156212, pp. 1-4, Nov. 20, 2015 (Year: 2015).*
S. Donovan, Diameter Agent Overload and the Peer Overload Report, Oct. 10, 2015, pp. 1-18 (Year: 2015).*
S. Donovan, Diameter Overload Rate Control, Oct. 31, 2015, pp. 1-20 (Year: 2015).*
S. Donovan, Diameter Load Information Conveyance, Oct. 12, 2015, pp. 1-20 (Year: 2015).*
Author Unknown, 3GPP TS 32.299 V13.2.0, pp. 1-177, Sep. 2015 (Year: 2015).*
International Search Report & Written Opinion dated Sep. 12, 2016 corresponding to International Patent Application No. PCT/EP2015/078610.
3GPP TR 29.809 V12.0.0 (Jun. 2014), Technical Report, 3rd Generation Partnership Project; Technical Specification Group Core Network and Terminals; Study on Diameter overload control mechanisms (Release 12), Jun. 2014, XP050907132.
J. Korhonen et al., "Diameter Overload Indication Conveyance," RFC7683.txt, Internet Engineering Task Force (IETF); RFC 7683, Oct. 28, 2015, pp. 1-42, XP015109740.
"Digital cellular telecommunications system (Phase 2+); Universal Mobile Telecommunications System (UMTS); LTE; Telecommunication management; Charging management; Diameter charging applications (3GPP TS 32.299 version 12.8.0 Release 12)," Technical Specification, European Telecommunications Standards Institute (ETSI), ETSI TS 132 299 V12.8.0 (Apr. 2015), Apr. 1, 2015, XP014248498.

* cited by examiner

OVERLOAD CONTROL HANDLING IN CASE OF AN OVERLOAD STATE OF A CHARGING ENTITY

FIELD OF THE INVENTION

The present invention relates to an apparatus, a method and a computer program product for handling overload control in case of an overload state of a charging entity.

RELATED BACKGROUND ART

The following meanings for the abbreviations used in this specification apply:
ACR Accounting Request
AVP Attribute-Value Pair
CCA Credit-Control Answer
CCA-I Credit-Control Answer—Initial Answer
CCA-U Credit-Control Answer—Update Answer
CCR Credit-Control Request
CCR-I Credit Control Request—Initial Request
CCR-U Credit Control Request—Update Request
CP Charging Profile, also known as Charging Behaviors Profile
CTF Charging Trigger Function
DCCA Diameter Credit-Control
DOIC Diameter Congestion Information Conveyance
G-S-U Granted-Service-Units
IP-CAN Internet Protocol Cellular Access Network
KPI Key Performance Indicator
OC Overload Control
OCS Online Charging System
OLR Overload Report
PCEF Policy and Charging Enforcement Function
PGW Packet Data Network Gateway
RG Residential Gateway In the following, also some terms as used in the present application are defined:
Abatement: Reaction to receipt of an overload report resulting in a reduction in traffic sent to the reporting node. Abatement actions include diversion (in which the reacting node selects alternate destinations or paths for requests) and throttling (in which the number of requests sent by the DIOC reacting node is limited).
Overload Control State: Internal state maintained by a reporting or reacting node describing occurrences of overload control.
Overload Report (OLR): Overload control information for a particular overload occurrence sent by a reporting node.
Reacting Node: A Diameter node that acts upon an overload report.
Reporting Node: A Diameter node that generates an overload report. (This may or may not be the overloaded node.)
Online Charging System (OCS): the entity that performs real-time Credit-Control. Its functionality includes transaction handling, rating, online correlation and management of subscriber account balances.
Gy: Online charging reference point between a PCEF and an OCS.
Ro: Online charging reference point between a 3GPP network element (e.g. PGW) and the OCS.

Embodiments of the present invention relate to "Diameter Overload Control in Charging Applications", which is partially covered in 3GPP TR 29.809, and in Internet Draft IETF Draft draft-ietf-dime-ovli-08, and refers in particular to an implementation of the general DOIC protocol (Diameter Congestion Information Conveyance) in diameter applications.

DOIC proposes that an overload report is sent in the answer to a diameter message. For diameter charging applications, it means that it is a response to an accounting or credit control request, for an already established diameter session.

In case the diameter server is in overload situation, it will start replying to its active diameter sessions with overload indications in order to reduce the traffic.

When new bearers are created at the PGW, an initial message is sent towards the diameter server. Those diameter messages towards an overloaded diameter server can not be prevented according to the approved DOIC algorithm which 3GPP will now standardize. This happens because as it is a first message for a session, there is no previous reply which can be used by the diameter session to apply the DOIC abatement algorithm.

Therefore, there is a problem that DOIC does not solve. When the diameter server is in overload state, the new bearers will keep sending diameter messages to the congested server without applying DOIC, making the overload situation worse.

Diameter Base Protocol (RFC 3588/RFC 6733) defines DIAMETER_TOO_BUSY as the diameter congestion control used by all diameter applications (including diameter charging applications). For failure at OCF (Online Charging Function, Ro/Gy interface), at reception of such error code, the diameter client initiates the configured failure handling mechanism, which is defined by 3GPP and is application specific (See 3GPP TS 32.251 Annex B for the failure handling mechanism applied to Diameter online charging application).

Failure handling mechanisms, in case there is no secondary server to take over the session, will mean that the subscriber services will be terminated. The DCCA termination is immediate, and the Bearer termination can be immediate (failure handling TERMINATE), or after a timer expires (failure handling CONTINUE).

The result is that in case of congestion (or temporal failure) in a diameter charging application, subscriber services are impacted (bad customer experience), and there is an economical impact to operators (due to charging interfaces not working as designed) this situation extends until the bearers are deleted. If congestion at OCS eases, there is no possibility to regain credit control for the active bearers that were affected due to OCS overload).

Figure 6:
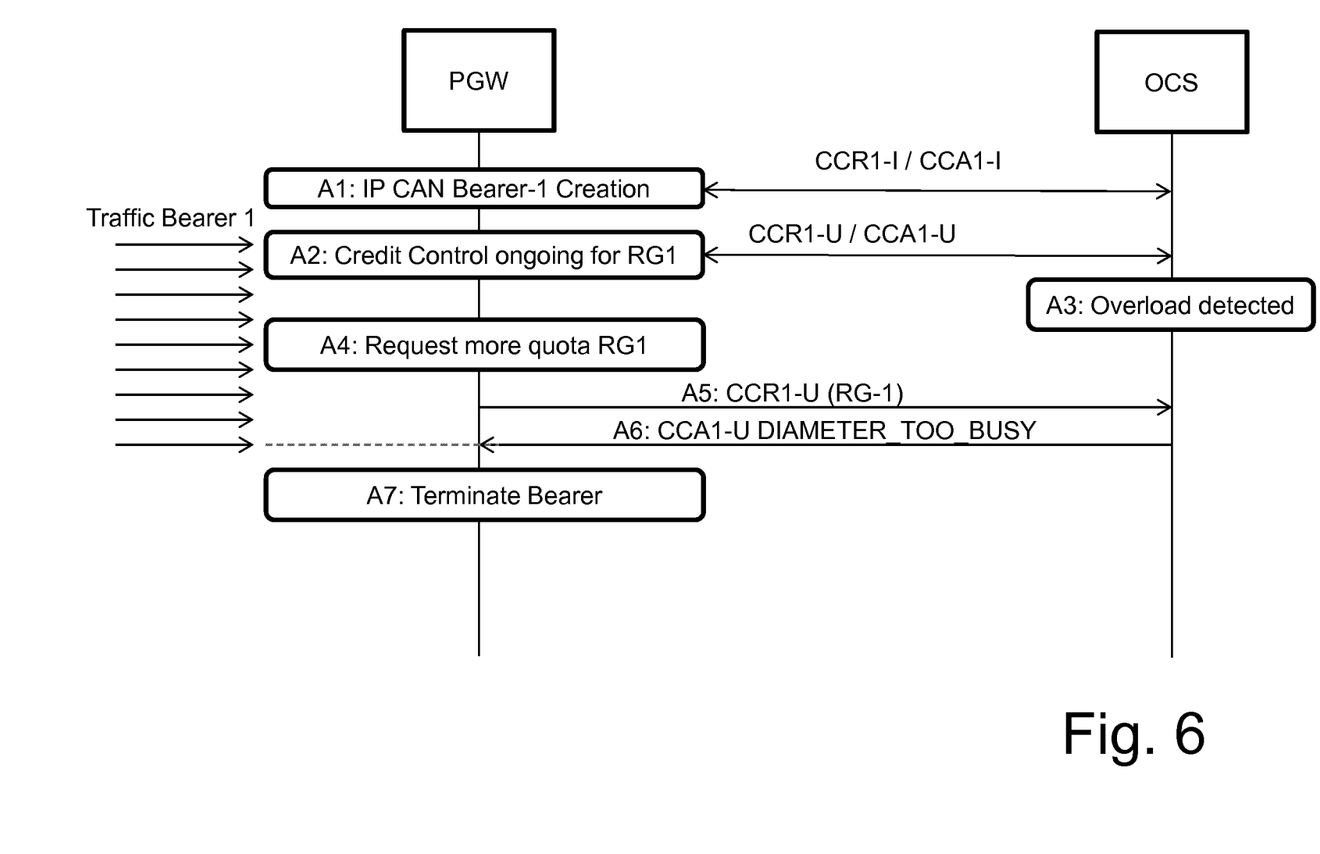
FIG. 6 shows a signaling flow between PGW and OCS according to prior art.

This overload congestion mechanism (which 3GPP tries to improve) is illustrated in FIG. 6.

In particular, FIG. 6 illustrates 3GPP behavior with legacy overload control (RFC 3588) and shows a signaling flow between the OCS (the reporting node) and the PGW (reacting node). In A1, an IP CAN Bearer-1 is created. For this, the PGW sends a credit-control request (CCR) to the OCS for creating the IP CAN Bearer-1 (CCR1-I), and the OCS responds with a credit-control answer (CCA) for the IP CAN Bearer-1 (CCA1-I). In A2, credit control is ongoing for RG1 (residential gateway for which the IP CAN Bearer-1 was created). If due to a charging trigger an update is required, corresponding CCR1-U/CCA1-U messages are exchanged between PGW and OCS.

In A3, an overload is detected at the OCS. In A4, a request for more quota for RG1 is created, and in A5, a corresponding request CCR1-U(RG1) is sent to the OCS. Since the OCS is in overload, the OCS responds with CCA1-U DIAMETER_TOO_BUSY.

Thus, there is a need to improve overload control or congestion control in such a case.

SUMMARY OF THE INVENTION

Embodiments of the present invention address this situation and aim to overcome the above-described problem and to improve overload control (congestion control) in case of an overloaded charging entity.

According to a first aspect of the present invention an apparatus is provided which comprises at least one processing circuitry, and at least one memory for storing instructions to be executed by the processing circuitry, wherein the at least one memory and the instructions are configured to, with the at least one processing circuitry, cause the apparatus at least: to control a charging control session with a charging entity, to receive an overload report from the charging entity, and to prevent sending any charging related request messages to the charging entity until a predetermined period has elapsed.

According to a second aspect of the present invention a method is provided which comprises:

controlling a charging control session with a charging entity, receiving an overload report from the charging entity, and preventing to send any charging related request messages to the charging entity until a predetermined period has elapsed.

The first aspect and the second aspect may be modified as follows:

For example, after the end of the predetermined period, a charging related request message comprising latest charging values and quotas consumed per rating group may be sent to the charging entity.

The charging related request message may be marked by a specific indication. For example, the specific indication may be a reporting reason value.

Furthermore, a charging trigger received during the predetermined period may be ignored.

The predetermined period may be an expected overload period indicating an expected duration of the overload of the charging entity sent with overload report.

A congested state of the charging entity may be determined by counting a number of messages of the charging entity which comprise an indication that the charging entity is congested, and it may be determined that the charging entity is congested when the number of messages exceeds a threshold.

Furthermore, a number of all messages received from the charging entity may be counted, a percentage of those messages comprising the indication that the charging entity is congested to the number of all messages may be calculated, and it may be determined that the charging entity is congested when the percentage exceeds a percentage threshold.

The charging related request messages not sent to the charging entity may be stored until the predetermined period has elapsed, and the stored charging related request messages may be forwarded to the charging entity after the predetermined period has elapsed.

A timer which controls when the transport connection is terminated in case of no reply from the charging entity may be halted during the predetermined period.

Moreover, it may be detected whether the charging entity supports overload control, and, in case the charging entity does not support overload control, parameters locally configured by the apparatus may be applied for performing an overload control.

The locally configured parameters may include a predetermined time during which it is expected that the charging entity is overloaded.

The predetermined time may be calculated by using a random number between a lower limit and an upper limit for the predetermined time.

According to a third aspect of the present invention an apparatus is provided which comprises at least one processing circuitry, and at least one memory for storing instructions to be executed by the processing circuitry, wherein the at least one memory and the instructions are configured to, with the at least one processing circuitry, cause the apparatus at least: to control a charging control session, to detect an overload on the apparatus, to send a message including an overload report and an expected overload period to a gateway entity involved in the charging control session, to grant a certain quota of charged services for a subscriber, and to indicate the quota in the message, and to determine the quota based on the expected overload period.

According to a fourth aspect of the present invention a method is provided which comprises:

controlling a charging control session, detecting an overload on the charging entity, sending a message including an overload report and an expected overload period to a gateway entity involved in the charging control session, granting a certain quota of charged services for a subscriber, and indicating the quota in the message, and determining the quota based on the expected overload period.

The third aspect and the fourth aspect may be modified as follows:

For example, the quota may be determined based on an expected consumption of the subscriber during the expected overload period.

After expiry of the expected overload period, a message including a specific indication may be received from the gateway entity.

After expiry of the expected overload period, a message including reported consumed quota of a subscriber may be received, and the subscriber may be charged for the reported quota based on lowest tariff during the overload period.

According to a fifth aspect of the present invention a computer program product is provided which comprises code means for performing a method according to the second aspect and/or fourth aspect and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to a sixth aspect of the present invention an apparatus is provided which comprises means for controlling a charging control session with a charging entity, means for receiving an overload report from the charging entity, and means for preventing to send any charging related request messages to the charging entity until a predetermined period has elapsed.

According to a seventh aspect of the present invention an apparatus is provided which comprises
  means for controlling a charging control session,
  means for detecting an overload on the charging entity,
  means for sending a message including an overload report and an expected overload period to a gateway entity involved in the charging control session,
  means for granting a certain quota of charged services for a subscriber, and indicating the quota in the message, and
  means for determining the quota based on the expected overload period.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Before describing embodiments, it is again referred to the problem which was described in connection with FIG. 6.

In particular, the RFC/3GPP solution as described in connection with FIG. 6 is disadvantageous, as the bearer and, thus, the service will be terminated. This is rather unacceptable for operators, and will possibly lead to developing proprietary solutions.

The DOIC IETF solution can be found, for example, in: https://tools.ietf.org/html/draft-ietf-dime-ovli-08

Figure 7:
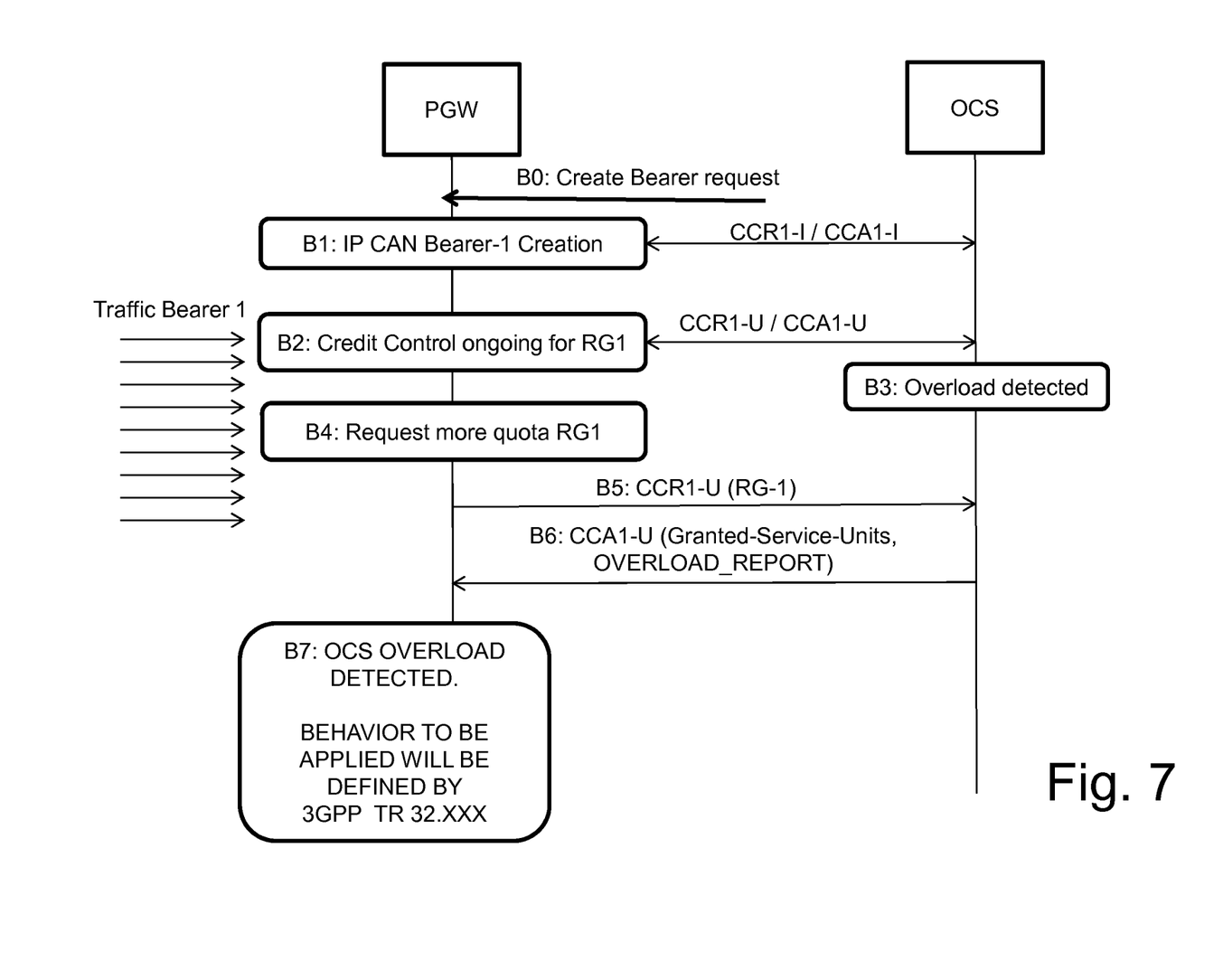
FIG. 7 shows another signaling flow between PGW and OCS according to prior art.

FIG. 7 shows the scope of the new 3GPP new standardization work. It is noted that there is no requirement regarding if the DCCA session shall be terminated or continued after the overload period is over.

In particular, after receiving a request to create a bearer, as indicated in B0 in FIG. 7, the same processes as described above in connection with FIG. 6 follow, that is, processes B1 to B5 of FIG. 7 are identical to the processes A1 to A5 of FIG. 6. However, in B6, instead of simply sending the DIAMETER_TOO_BUSY answer, the OCS sends CCA1-U (Granted-Service-Units, OVERLOAD_REPORT). In B7, the measures to be taken upon detection of an OCS overload are indicated.

Embodiments of the present invention aim to improve overload control or congestion control in case of an overloaded charging entity, wherein some embodiments aim to improve diameter overload control in charging application. Certain embodiments improve the congestion control by applying a handling mechanism which is applied at the reacting node (e.g., PGW, PCEF) when it receives an overload report from a reporting node (e.g., OCS).

Summarizing, as will be described in the following, some embodiments of the present invention refer to DOIC ("Diameter Overload Indication Conveyance")—particularly, to the integration of DOIC into diameter charging applications. According to some embodiments, a process is provided on how to proceed whenever one node ("reporting node"—OCS in our case) is in overload condition.

As mentioned above, in legacy systems, for overload situations, the respective overloaded node sends out the indication "DIAMETER_TOO_BUSY" to the requesting node. With DOIC a more detailed "Overload Report" will be provided. Amongst other things this Overload Report comprises an OC-Validity-Duration parameter that indicates an (assumed) duration of the overload situation.

First Embodiment

In the following, a general overview of the present embodiment is described by referring to FIG. 1. According to the first embodiment, the DOIC is implemented in the DCCA (diameter credit control application) by applying a quarantine period without service disruption to the DCCA session.

Figure 1:
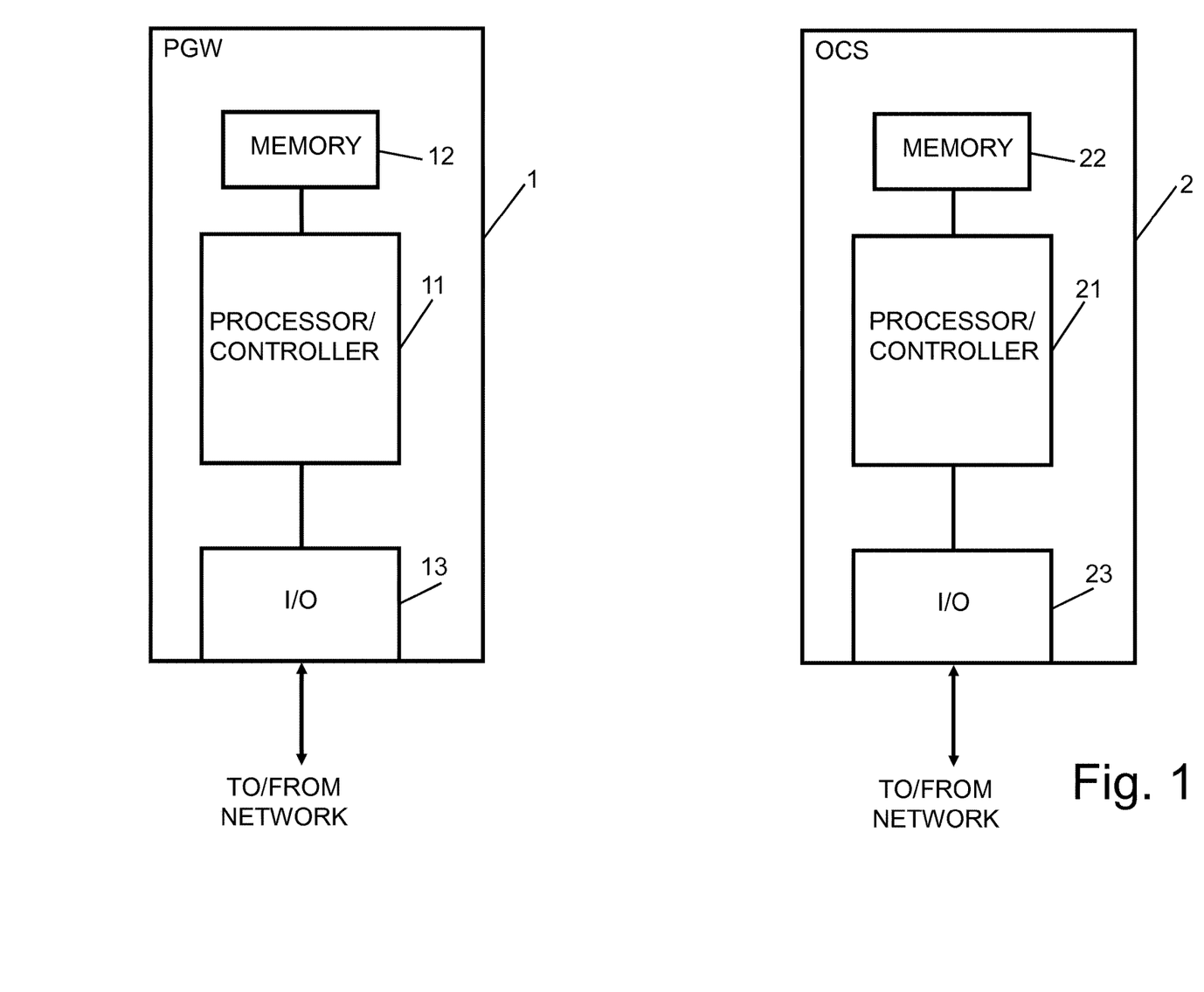
FIG. 1 shows simplified structures of a PGW 1 as an example for a reacting node and an OCS 2 as an example for a reporting node according to embodiments of the present invention.

In particular, FIG. 1 shows a PGW 1 as an example for a first apparatus according to the present embodiment, which may be a gateway entity and may represent a reacting node, and an OCS 2 as an example for a second apparatus according to the present embodiment, which may be a charging entity and may represent a reporting node.

The PGW 1 comprises a processor/controller 11 as an example for at least one processing circuitry and a memory 12 as an example for at least one memory for storing instructions to be executed by the processing circuitry.

The memory 12 and the instructions are configured to, with the processor 11, cause the PGW 1 to control a charging control session (e.g., a DCCA session) with a charging entity (e.g., OCS 2), to receive an overload report from the charging entity, to prevent sending (or to not send) any charging related request messages (e.g., CCR messages) to the charging entity until a predetermined period has elapsed.

The OCS 2 comprises a processor/controller 21 as an example for at least one processing circuitry and a memory 22 as an example for at least one memory for storing instructions to be executed by the processing circuitry.

The memory 22 and the instructions are configured to, with the processor 21, cause the OCS 2 to control a charging control session (e.g., a DCCA session), to detect an overload on the apparatus, to send a message including an overload report and an expected overload period to a gateway entity (e.g., PGW 1) involved in the charging control session, to grant a certain quota of charged services for a subscriber (e.g., a rating group), and to indicate the quota in the message, and to determine the quota based on the expected overload period.

The predetermined period described above may be the expected overload period of the OCS 2.

Hence, according to the present embodiment, it is ensured that the ongoing charging control session will not contact the charging entity (OCS 2) during the predetermined period, and the charging entity will grant a large enough quota to be consumed during the expected overload period.

In addition, the PGW 1 and the OCS 2 may further comprise input/output (I/O) units or functions (interfaces) 13 or 23 connected to the processor or processing function 11 or 21. The I/O units 13 and 23 may be used for performing communication between the PGW 1 and the OCS 2, and may also be used for communicating with other entities or functions not shown in FIG. 1.

In the following, a more detailed modification of the present embodiment is described.

According to a more detailed modification of the first embodiment, it is proposed that in case of congestion, when the reacting node (CTF, PCEF, PGW) receives the OCS congestion report in a CCR message, which results in the need to apply congestion control in the DCCA-session, the PCEF will behave as follows:

A proposed mechanism will enforce that the DCCA-session will not contact OCS again until OC-Validity-Duration (parameter which is part of the DOIC overload report) expires.

This mechanism is as follows:

A 3GPP Graceful Service Termination is applied to every active rating group. The last granted "Granted-Service-Units" AVP will be normally consumed after the Overload Indication has been received by the PCEF. Once the quota is consumed, a quarantine period will be applied until the end of the OC-Validity-Duration. That is, the quarantine period is shorter than the OC-Validity-Duration.

The quarantine period will also apply to the DCCA session (this is not a 3GPP current behavior). This is proposed as follows: At reception of the overload report (also referred to as Congestion Report), OC-Validity-Duration starts running. Until that timer expires, the DCCA session will not trigger any new CCR towards OCS. In case of Charging Triggers occurring during that period, those will be throttled (ignored). At the end of the OC-Validity-Duration, a new CCR will be sent with the latest charging values and quotas consumed per Rating Group.

The last "Granted-Service-Units-AVP" quota granted when OCS requested for the overload control, will be consumed by the active Rating Groups until it is exhausted. If there are charging triggers which would require quota reauthorization, those are ignored, therefore the last granted quota will survive any charging event, until the quota is finally consumed. Once quota is exhausted, the quarantine period is applied to the rating group (RG). Quarantine period expires when OC-Validity-Duration expires.

The OCS shall grant a large enough amount of quota considering the expected consumption during the requested OC-Validity-expired period.

For example, the quota can be determined such that it is detected how much quota was consumed in the corresponding DCCA session during a past time period which is equal to the OC-Validity-Duration. Then, the quota could be determined such that it equals the past consumed quota, or that it is smaller than the past consumed quota.

A new Reporting Reason is proposed according to the present embodiment: "OC-Validity-expired". This Reporting Reason will be used in the CCR generated at the end of the OC-Validity-Duration.

At reception at the OCS of a CCR with Reporting Reason "OC-Validity-expired", OCS will subtract the reported quota from subscriber's account, taking into account the lack of information of the charging triggers during the OCS congestion phase (e.g. the lowest tariff from the possible charging triggers).

The OCS will reply with a CCA as normal, and the DCCA session will be considered fully reestablished.

If at reception at the OCS of a CCR with Reporting-Reason "OC-Validity-expired", the OCS still is experiencing overload, it will reply with a CCA indicating the new overload status, in order for the reacting node to apply again the same quarantine behavior as explained above.

Figure 2:
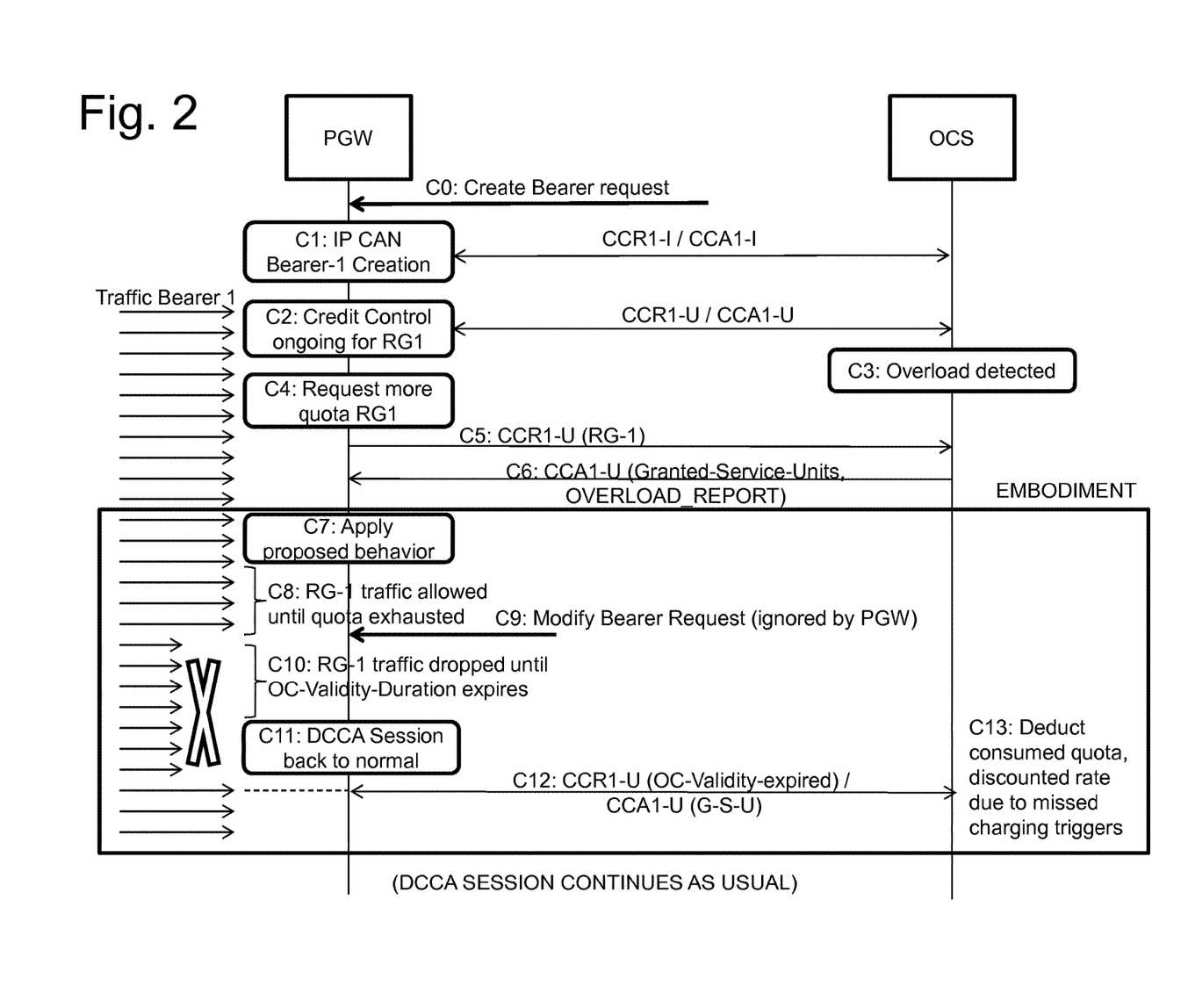
FIG. 2 shows a signaling flow between PGW and OCS according to a first embodiment of the present invention.

The overload control behavior according to the present embodiment is illustrated in FIG. 2.

The signaling flow is based on the signaling flow as shown in FIG. 7, so that C0 to C6 are identical to B0 to B6 shown in FIG. 7, and are not repeated here.

In C7, the PGW 1 applies the proposed behavior. In C8, RG-1 traffic (traffic or traffic bearer 1 of the rating group 1) is allowed until the quota is exhausted. When then a request to modify a bearer is received, as indicated in C9, this request will be ignored by the PGW. After this, RG-1 traffic will be ignored until the OC-Validity-Duration expires. After expiry of the OC-Validation-Duration, the DCCA session gets back to normal, as indicated in C11. In C12, the PGW sends CCR1-U (OC-Validity-expired), i.e., a CCR including the new Reporting Reason described above, and the OCS responds with CCA1-U (G-S-U), i.e., with a CCA including new granted service units. In C13, the OCS deducts consumed quota, and applies a discounted rate due to missed charging triggers.

After this, the DCCA session continues as usual.

According to the present embodiment, the following advantages are achieved: The solution as described according to the embodiment is compatible with DOIC. There is minimum impact to subscriber traffic and operator revenue. When OCS grants big enough quota, impact to subscriber service is zero. There are low implementation efforts, because it reuses already available 3GPP functionality. Because charging triggers are ignored, resources at the reacting node are not increased compared to the non-congestion situation.

The solution according the embodiment as described above is exactly within the scope of the solutions which 3GPP is trying to analyze and standardize.

It can be implemented in 2 phases. First phase with hardcoded DOIC parameters, so that it can be proposed to operators to be implemented before 3GPP Release 14. Then in Release 14, same solution can start using the parameters coming from the DOIC overload report instead of the hardcoded values from the first implementation phase.

Summarizing, according to the first embodiment and its modifications, when an OCS is in an overload situation (and sends the overload report for a session to the reacting node), all further messages to the OCS of this session should be avoided (for the near future). It is proposed to introduce a "quarantine period" for the current session. This means that when the OCS is overloaded no new CCRs will be sent to the OCS—and, in case of charging triggers, these will be ignored. Only when the (assumed) overload situation is over, the latest charging values and the quotas consumed are forwarded to the OCS. The OCS may subtract the consumed quota from the respective account using, to be on the safe side, e.g. the lowest tariff (as some charging triggers were lost).

The message sent when the assumed overload situation is over may be accordingly marked for the OCS. Only if the OCS is not overloaded anymore the OCS may proceed as explained above. If the overload situation persists, an overload report is sent (once more) and the quarantine period may be extended.

Further, when sending the (first) overload report, the granted quota is made large enough to endure the expected overload situation.

Second Embodiment

In the following, a second embodiment is described. According to the second embodiment, the DOIC mechanism is extended for new diameter sessions in which reporting node overload status is not available. The following description emphasizes the differences to the first embodiment.

In particular, the general structure of apparatuses according to the present second embodiment is similar to that as shown in FIG. 1. That is, the PGW as an example for a first apparatus according to the present second embodiment, which may be a gateway entity and may represent a reacting node, comprises also a processor/controller 11 as an example for at least one processing circuitry and a memory 12 as an example for at least one memory for storing instructions to be executed by the processing circuitry.

According to the second embodiment, the memory 12 and the instructions are configured to, with the processor 11, cause the PGW 1 to control a charging control session (e.g., a DCCA session) with a charging entity (e.g., OCS 2), to determine a congested state of a charging entity by counting a number of messages of the charging entity which comprise an indication that the charging entity is congested, and to determine that the charging entity is congested when the number of messages exceeds a threshold.

The determination can be effected by counting a number of all messages received from the charging entity, and calculating a percentage of those messages comprising the indication that the charging entity is congested to the number of all messages, and determining that the charging entity is congested when the percentage exceeds a percentage threshold.

When the charging entity is determined as being congested, a predetermined period (e.g., OC-Validity-Duration) can be started.

When the charging entity is determined as being congested, the PGW may create a diameter session to another charging entity.

In case a bearer must be created using the congested charging entity, and no other charging entity is available, bearer creation is allowed without sending an initial diameter message to the congested charging entity.

In the following, a more detailed modification of the present embodiment is described.

According to a more detailed modification of the present second embodiment, three separate logic modules are provided which act together to extend DOIC functionality to new bearer creations. This functionality can be applied equally to both Diameter Charging Applications: Rf and Ro/Gy.

Figure 3:
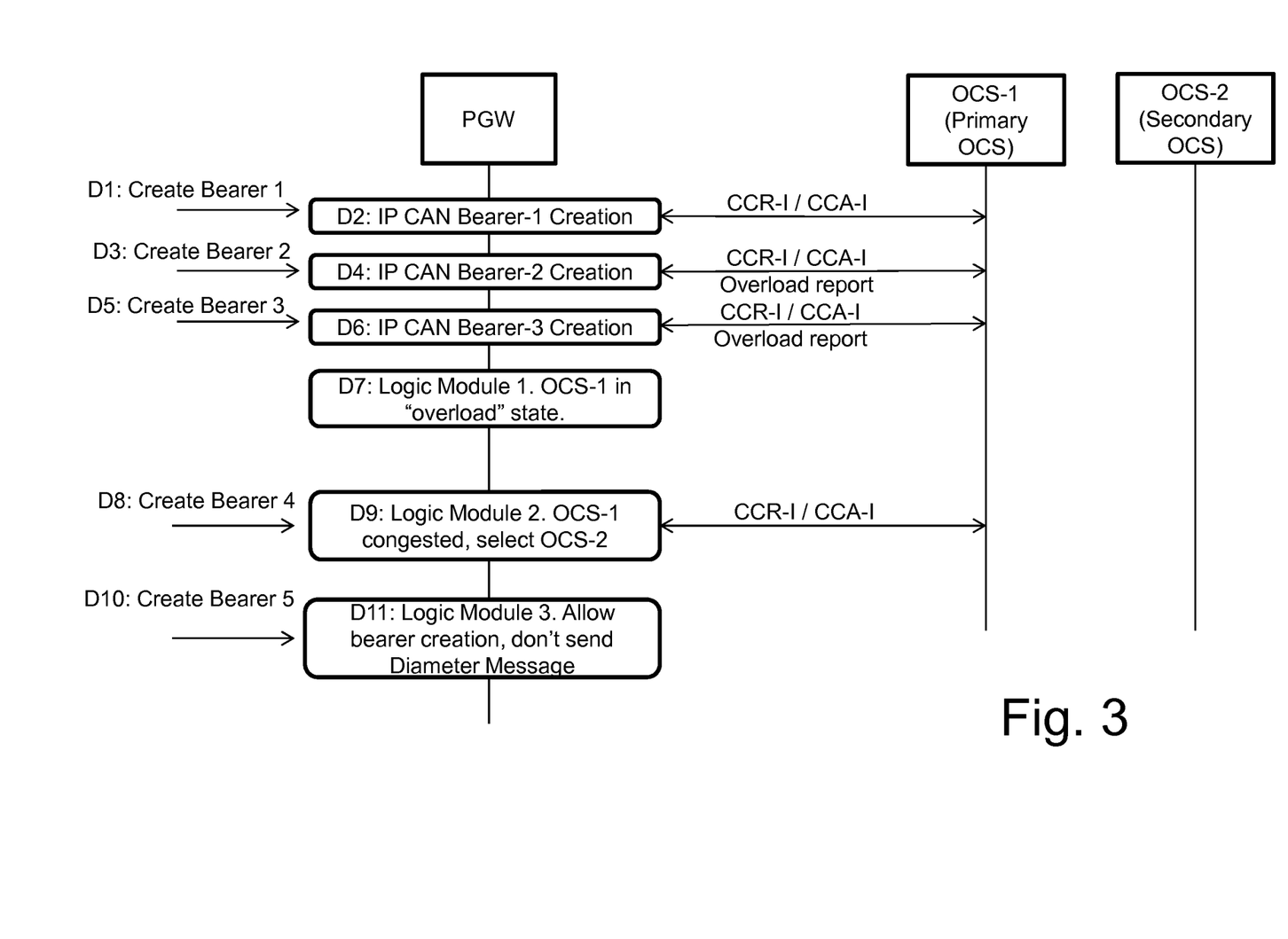
FIG. 3 shows a signaling flow between PGW and OCS according to a second embodiment of the present invention.

FIG. 3 illustrates a flow diagram for extending DOIC to new diameter sessions according to the present second embodiment.

Module 1: This is a module for defining the congested state of the Diameter Server, which may be an OCS, and in the example of FIG. 3, OCS-1 (primary server).

In particular, the reacting node (e.g., PGW) estimates the state of the OCS as follows: The PGW collects a running counter of the last messages received by the diameter client from the diameter server (from every diameter session). If over K percent (as an example for a percentage threshold) of those replies included an indication that the OCS (as an example for a Diameter Server) is congested, then the PGW (as an example for a Diameter Client) will mark the state of the reporting node as congested. This running KPI will provide then a never expiring status, because at every moment it knows (according to last messages received) if the diameter server is congested or not. In this way, the reacting node can also calculate at any point in time (in case the reporting node is overloaded) the estimated OC-Validity-Duration, as the average of all the running OC-Validity-Duration from other diameter sessions active at the reacting node. In case of legacy OCS (i.e., a legacy diameter server, which replies with DIAMETER_TOO_BUSY, but is not able to send an overload report), then the PGW (Diameter Client) can use locally configured default values for such cases (e.g., OC-Validity-Duration=10 minutes). A more detailed description concerning this situation is given in the fourth embodiment.

The above processes are illustrated in FIG. 3 in D1 to D7. In D1, a request for creating a bearer 1 is received by the PGW, which performs IP CAN Bearer-1 Creation in D2, which involves exchanging CCR-I/CCA-I with the OCS-1. In D3, a request for creating a further bearer 2 is received by the PGW, which performs IP CAN Bearer-2 Creation in D4, which involves exchanging CCR-I/CCA-I with the OCS-1. However, this time the OCS-1 includes an overload report into CCA-I, i.e., an indication that the OCS-1 is congested. In D5, a request for creating another bearer 3 is received by the PGW, which performs IP CAN Bearer-3 Creation in D6, which again involves exchanging CCR-I/CCA-I with the OCS-1. Also this time, the OCS-1 inserts an overload report into CCA-I. In this example, two of three messages form the OCS-1 contain an indication that the OCS-1 is congested, so that in this example a threshold (e.g., K=50% or the like) is exceeded. Hence, in D7 (logic module 1), the OCS-1 is determined to be in an overload state.

Module 2: This is a module for selecting the OCS according to OCS congested state.

When the PCEF receives a create bearer request, it will select the diameter server for the new bearer. If the configured primary diameter server (OCS or CDF) is in overload state (module 1), it will create the diameter session towards a secondary diameter server (e.g., the OCS-2 (secondary OCS) shown in FIG. 3). In this way, no more traffic is routed to the congested diameter server.

For example, as shown in FIG. 3, in D8 a request to create a bearer 4 is received, and in D9, which illustrates the logic module 2, the PGW selects the OCS-2, since the OCS-1 is congested. This involves exchanging of CCR-I/CCA-I with the selected OCS-2.

Module 3: This is a module for handling bearers which must be created using a congested Diameter Server.

If the primary diameter server is congested and there is no secondary diameter server configured (or if both, the primary and also the secondary diameter servers are known to be in congested state), then bearer creation is allowed without sending the initial diameter message towards the congested Diameter Server.

This is indicated in FIG. 3 by D10 and D11: In D10, a request to create a bearer 5 is received, and in D11 (logic module 3), the bearer creation is allowed, but no diameter message is sent to the OCS-1.

Handling of subscriber traffic during the overload period (until the KPI from module 1 indicates that any of the primary or secondary Diameter Server is not anymore in overload state) will be done in the same way as it is done for bearers which received the overload report as part of normal DOIC implementation (overload report received within the same bearer's diameter session).

When the Diameter Server is not anymore in overload period (when the KPI from module 1 determines that either the primary or the secondary Diameter Server is not anymore in overload state) a new diameter session will be created towards the diameter server. A new reporting reason could be used as the reason for sending the initial diameter message, to indicate that it is a delayed message for a bearer which was already created.

It is noted that the KPI from module 1 is only a best guess of the time when Diameter Server congestion will end. This is equivalent to the Diameter Server provided DOIC parameter OC-Validity-Duration, where the Diameter Server makes a guess of the time when the overload situation might expire, as it is not possible to know for sure when the overload state will end.

In module 3, if the overload situation at diameter server still persists, the Diameter Server will reply with the overload indication. At this point, the situation is identical than any ongoing bearer which receives the overload report as a response to a diameter request.

Also the second embodiment and its modifications are compatible with DOIC.

The proposed functionality extends functionality of DOIC, which means that signaling towards a congested Diameter Server is further reduced, thus increasing the value of the functionality for operators.

The proposed functionality can be implemented in phases, so that in a first phase (when Diameter Server still does not support DOIC, and replies only with DIAMETER_TOO_BUSY), the logic method proposed in module 1 could use locally configured values (e.g. the KPI would calculate how many DIAMETER_TOO_BUSY has been received in the period of time, in order to calculate the Overload State).

The solution according to the second embodiment brings savings to operators because it allows bearer creation (subscribers feel no service impact, can generate traffic according to operator's local policies) in the case when Diameter Server is overloaded (temporarily unusable). Standard DOIC implementation will simply reject those new bearers.

Summarizing, according to the present second embodiment, it is focused on cases where—in an overload situation for an OCS—it is desired to reduce the amount of messages sent (in the near future) to the OCS in order to disburden the OCS and to, subsequently, overcome the overload situation.

Normally, whenever a new session is to be created an initial message is sent to the OCS. As the initial message is the (obviously) first message for the respective session no overload report has been received for this session. The initial message would always be sent to the (overloaded) OCS.

According to the present second embodiment, it is proposed to locally (at the reacting node) determine whether or not the OCS is (may be) in an overload situation. This could be done by monitoring all overload report received from the OCS (for all further sessions). Thus, it is possible to estimate the status of the OCS (or, respectively, estimate a value for the OC-Validity-Duration). Depending on this determination the process is either continued normally (if no overload is assumed) or (if overload is assumed) another OCS could be used or (in case no further non-overloaded OCS is available) the session is created without the usual initial message. In the latter case an additional message could be sent explaining the reason for the delay of the message later on.

Third Embodiment

In the following, a third embodiment is described, according to which forwarding of charging related request messages (e.g., CCR messages) is delayed in case of an overload indication of a charging entity. The following description emphasizes the differences to the first and the second embodiments.

In particular, the general structure of apparatuses according to the present third embodiment is similar to that as shown in FIG. 1. That is, the PGW as an example for a first apparatus according to the present third embodiment, which may be a gateway entity and may represent a reacting node, comprises also a processor/controller 11 as an example for at least one processing circuitry and a memory 12 as an example for at least one memory for storing instructions to be executed by the processing circuitry. Similar, the OCS as an example for a second apparatus according to the present third embodiment, which may be a charging entity and may represent a reporting node, comprises also a processor/controller 21 as an example for at least one processing circuitry and a memory 22 as an example for at least one memory for storing instructions to be executed by the processing circuitry.

According to the third embodiment, the memory 12 and the instructions are configured to, with the processor 11, cause the PGW 1 to control a charging control session (e.g., a DCCA session) with a charging entity (e.g., OCS 2), to receive an overload report from the charging entity, to store any charging related request messages (e.g., CCR messages) until a predetermined period has elapsed, and to forward the stored charging related request messages to the charging entity after the predetermined period has elapsed.

Furthermore, according to the third embodiment, the memory 22 and the instructions are configured to, with the processor 21, cause the OCS 2 to control a charging control session, to detect an overload on the apparatus (OCS), to send a message including an overload report and an expected overload period to a gateway entity involved in the charging control session (e.g., PGW 1), to receive charging related request messages which were stored by the gateway entity, and to respond to the received charging related request messages with a charging related answer messages including a specific indication that the charging related request messages were successfully received.

The charging related request messages may be stored by the PGW in a memory, which is preferably a non-volatile memory.

When sending the stored charging related request messages to the charging entity, the oldest may be sent first. That is, for the same charging control session, the stored charging related request messages may be sent in the order of storing them, so that the oldest is sent first and the newest is sent last.

Moreover, a timer (e.g., timer Tx) which controls when the transport connection is terminated in case of no reply from the charging entity may be halted during the predetermined period.

In the following, a more detailed modification of the present embodiment is described.

According to this more detailed modification of the present third embodiment it is proposed to keep the same 3GPP failure handling mechanisms unmodified, however it proposed to delay (in opposition to modify, discard, ignore) the transmission of CCR messages towards OCS by a time equal to OC-Validity-Duration (value is provided by the reporting node as part of DOIC implementation).

It is also proposed a new functionality to be executed at the reacting node (CTF/PCEF/PGW). The new functionality is applied starting at the time the overload report was received, and it finishes when the overload situation ends. According to the present embodiment, the new functionality will work as follows:

When the overload report is received (CCA message), and the DOIC abatement algorithm decides to apply it to the current DCCA session, the OC-Validity-Duration timer starts running. DCCA session is not yet affected and it continues as normal (this is DOIC protocol expected behavior. From this point on, it is application specific, and covered in the new 3GPP study item. IPR proposed behavior follows).

When there is the need for a new CCR message to be triggered for the same DCCA session, in case OC-Validity-Duration timer is still active, the CCR message will be queued in non volatile memory (preferred solution, however volatile memory could be accepted by most operators).

Future CCR messages which are triggered for the same DCCA session will also be stored in a similar way.

When the OC-Validity-Duration timer expires, the oldest CCR from the queue will be sent to OCS.

It is noted that an expiry of the OC-Validity-Duration does not mean that OCS is not in overload, it is only an estimate. Then, when the oldest CCR is sent towards OCS, it is possible that OCS reply (CCA) will include a new overload report (if congestion at OCS persists) or not (if there is not congestion at OCS anymore).

Such cases are covered in the solution according to the present third embodiment as follows:

If CCA message contained OC-Validity-Duration=0 (or AVP was absent, which means that no overload persists at OCS), then every CCR in the buffer will be forwarded to OCS (in the same order in which those were stored). Appropriate modifications to certain CCR AVPs might be applied (e.g. Requested-service-units-AVP omitted, modified termination-cause, session-length, etc.).

If a CCA message contained a valid OC-Validity-Duration (>0, which means that OCS congestion persists), then the OC-Validity-Duration timer is restarted with the new value provided by OCS. This means that future CCRs will keep going into local storage (non volatile memory) at the reporting node.

According to the present third embodiment, also a new AVP in Ro/Gy is proposed: "OC-Indication-AVP" (Overload-Control-Indication) which is added by the reacting node to every stored CCR message (equivalent "OC-Indication" field is added to CDRs generated during the time the OC-Validity-Duration timer is active). At reception of the OC-Indication-AVP, the OCS will recognize that the CCRs belong to stored charging data (as opposed of real time charging data as the usual case). Therefore OCS will always reply with Result-Code=SUCCESS to such CCRs. OCS will also not grant quota (as the CCRs purpose is only to report charging data. Credit Control is not applicable to past events).

The PGW (PCEF) will not include the OC-Indication to the last CCR in the queue to indicate OCS that such CCR is already the latest (realtime) and thus, credit control can be applied (if subscriber still has credit left). OCS can then grant more quota, or reply with any result code as usual.

Finally, the invention proposes that the Tx timer is halted in case of an active OC-Validity-Duration timer is active. This will prevent the transport layer to assume that there is a network error (which would trigger the failure handling mechanism to every DCCA session in the reporting node, which must be avoided). It is noted that the Tx timer is defined in 3GPP 32.251 Annex B.

Figure 4:
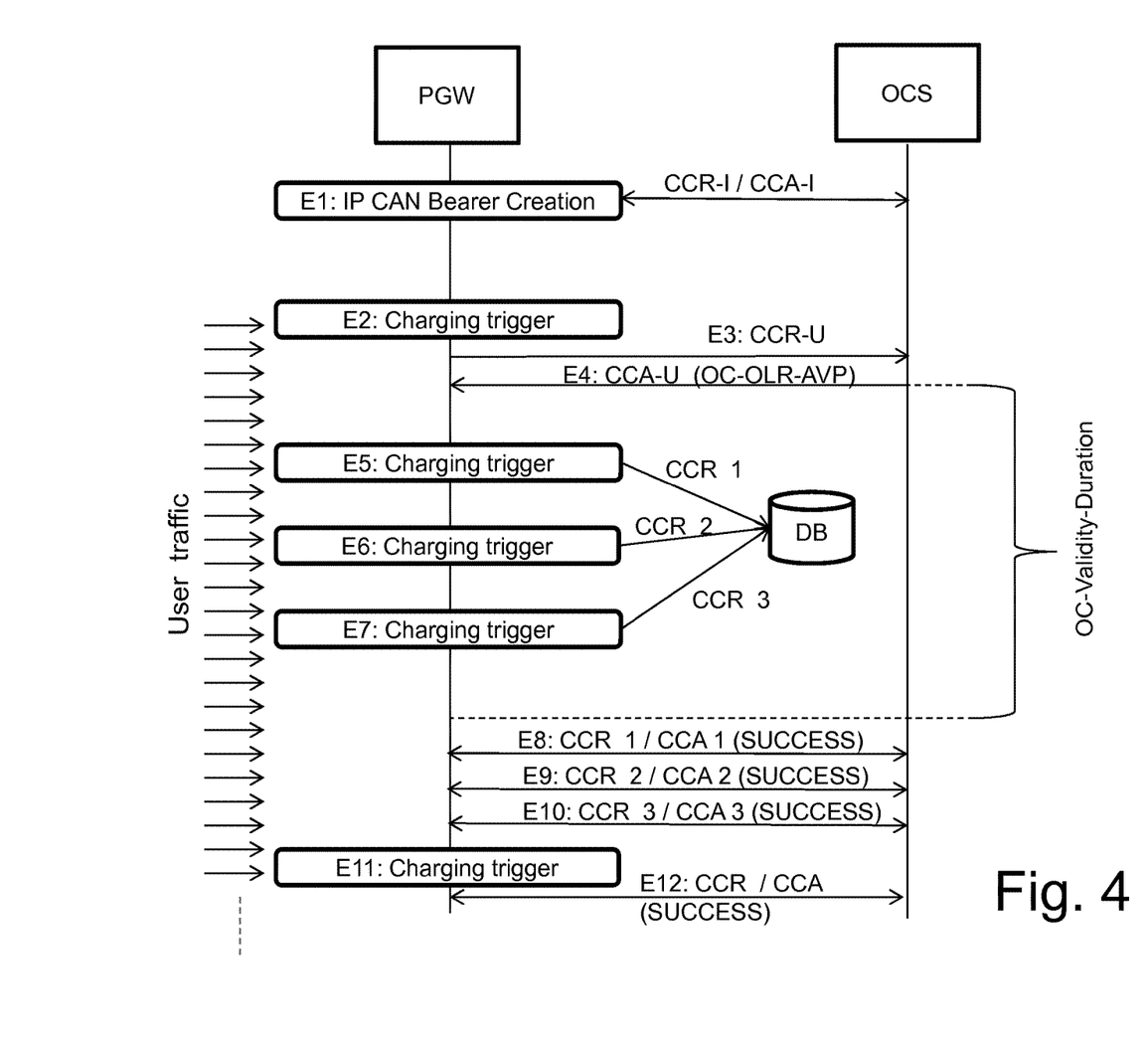
FIG. 4 shows a signaling flow between PGW and OCS according to a third embodiment of the present invention.

A procedure according to an example of the third embodiments is described in the following by referring to the flow diagram shown in FIG. 4:

In E1, an IP CAN bearer is created in a PGW (as an example for a reacting node), which involves exchanging CCR-I/CCR-A with an OCS (as an example for a reporting node). In E2, a charging trigger is received. Following this, the PGW sends a CCR-U to the OCS in E3. The OCS is congested, so that the OCS sends in E4 a CCA-U including OC-OLR-AVP, i.e., an overload report. At this time, the OC-Validity-Duration starts, so that upon following receptions of charging triggers in E5 to E7, the corresponding CCR1, CCR2 and CCR3 are all stored in a memory.

After expiry of the OC-Validity-Duration, the stored CCRs are forwarded to the OCS, as indicated in E8, E9 and E10. Each CCR1, CCR2 and CCR may contain the above-described "OC-Indication-AVP" (Overload-Control-Indication). The OCS responds with CCA1, CCA2 and CCA3 which all contain the Result-Code=SUCCESS, in case the request could be successfully processed.

Thereafter, the session continues normally. That is, when in E11 a charging trigger is received, the PGW sends in D12 a CCR to the OCS, which responds with a CCA, which contains also the Result-Code=SUCCESS.

In the following, some implementation details for the third embodiment are given.

New bearers. When the OC-OLR-AVP (congestion report) is received for a CCA-I message (message requesting authorization for a new bearer), local configuration can allow to reject bearer creation in such case. Otherwise, OC-OLR-AVP received at CCA-I has the same functionality than if received at CCA-U. At CCA-I it would mean that bearer is rejected or created according to the Result-Code AVP at CCA-Init, and that the OC-OLR-AVP will only be used to start the OC-Validity-Duration timer for storing future CCR-U messages.

Operator can locally configure the behavior in the reporting node in case the non volatile memory allocated for storing such CCRs gets depleted. Common options are: drop all user traffic when the storage is full (in order to not grant free traffic), allow the service to continue (oldest CCRs are deleted and newest is stored), etc.

It is noted that the failure handling mechanism for the bearer ("Terminate", "Retry-and-Terminate", "Continue") works as defined in 3GPP TS 32.251 Annex B. This invention does not modify such failure handling mechanisms. If OCS selects (by using Credit-Control-Failure-Handling AVP) e.g. Failure Handling Continue, then if a Result-Code triggers failure handling, the bearer will apply such failure handling (DCCA session is deleted, bearer is allowed to continue with free traffic and finally bearer is deleted after a timer expires, as explained in TS 32.251 Annex B). The present invention only delays the sending of a CCR according to the proposed logic, it does not care of the content of any AVP. Therefore the current invention works independent with any failure handling mechanism (e.g. the CCR message stored could be reporting the Final-Units-AVP as a result of an ongoing failure handling mechanism).

When OCS triggers an OC-OLR-AVP (with non zero OC-Validity-Duration), it is recommended to grant a quota which is big enough so that it can allow the uninterrupted subscriber traffic for the duration of the overload situation. Furthermore, it is recommended to use 3GPP functionality to grant quota in advance for Rating Groups which are not currently active but are so common that might become active during the overload period.

Summarizing, the third embodiment and its modifications relate to general messages (CCRs sent to the OCS). According to this embodiment, it is an aim to, in overload situations, avoid these messages (for the time being). When an overload report is received, all further messages are delayed. All further necessary CCRs may be stored locally in a memory until the (assumed time for the) overload situation has passed. When the respective time is over (i.e. the OC-Validity-Duration timer has run out) the first/oldest of the stored messages is sent. If the overload state at the OCS has ended so that the OCS operates normally again, all further stored messages are forwarded; if the OCS is still overloaded another overload report will be received and the timer is started again (and the messages are kept).

Fourth Embodiment

In the following, a fourth embodiment is described, according to which an implementation of DOIC in diameter charging applications in case of legacy reporting nodes is described. The following description emphasizes the differences to the first to third embodiments.

In particular, the general structure of apparatuses according to the present fourth embodiment is similar to that as shown in FIG. 1. That is, the PGW as an example for an apparatus according to the present fourth embodiment, which may be a gateway entity and may represent a reacting node, comprises also a processor/controller 11 as an example for at least one processing circuitry and a memory 12 as an example for at least one memory for storing instructions to be executed by the processing circuitry.

According to the third embodiment, the memory 12 and the instructions are configured to, with the processor 11, cause the PGW 1 to control a charging control session (e.g., a DCCA session) with a charging entity (e.g., OCS 2), to detect whether the charging entity supports overload control, and, in case the charging entity does not support overload control, to apply parameters locally determined by the apparatus for performing an overload control.

The overload control may include that the charging entity sends an overload report to the gateway entity (e.g., PGW 1). The parameters may include a predetermined time during which it is expected that the charging entity is overloaded. For example, this predetermined time may be OC-Validity-Duration. The predetermined time may also be calculated by using a random number between a lower limit and an upper limit for the predetermined time.

In the following, a more detailed modification of the present fourth embodiment is described.

As an initial remark, it is noted that according to the current specifications, sending of the overload report is optional, because the reacting node can not know if the reporting node does support DOIC or not. In case of overload, if the reporting node does not support DOIC, then instead of the overload report, it will rely on the legacy diameter result-code: DIAMETER_TOO_BUSY, which only indicates that the OCS is busy, but it does not carry any of the information made available in the DOIC's overload reports.

According to a more detailed modification of the present fourth embodiment a solution for implementing DOIC in case of legacy reporting nodes is proposed. A legacy reporting node in this context means a reporting node which does not send an overload report, but uses the legacy diameter result-code: DIAMETER_TOO_BUSY, as described above.

A first module according to the present fourth embodiment will make the reacting node (PGW/PCEF) to evaluate if the reporting node (OCS) has implemented DOIC protocol. This is done by following logic.

During a DOIC capability announcement phase, the reacting node sends (as specified by DOIC protocol) a CCR which includes an indication to the OCS that it does support DOIC, this is by including in the CCR the OC-Supported-Feature AVP.

If the OCS does not support DOIC, the OC-Supported-Feature AVP is ignored (it is not a mandatory AVP); however, if the OCS does support DOIC, according to DOIC specification, it shall reply also with a CCA including OC-Supported-Feature AVP.

When the reacting node sees the replied CCA message, if it does not contain OC-Supported-Feature AVP, then it will mark such OCS as not supporting DOIC.

A second module according to the present embodiment includes preconfigured DOIC parameters in the reacting node. In case the reacting node receives a diameter answer message which includes the legacy diameter indication of overload (DIAMETER_TOO_BUSY), the reacting node will apply the DOIC algorithm to such diameter session with the pre-configured DOIC values.

Such locally configured DOIC parameters at the reacting node will be the following:
  Abatement Algorithm
  Abatement Algorithm in case of reporting node unavailability
  Overload-Control-Reduction-Percent
  Overload-Control-Min-Validity-Duration
  Overload-Control-Max-Validity-Duration It is noted that the last two parameters are new parameters defined according to the present embodiment and are not part of the DOIC protocol, however as it is local configuration and it is not forwarded as a diameter AVP, it does not break compatibility with DOIC protocol).

The logic to be implemented in the reacting node according to the present embodiment is explained in the following.

DOIC currently defines only 1 abatement algorithm (the Loss algorithm). However this invention is transparent to the chosen algorithm. The invention defines the conditions and triggers when the abatement algorithm shall be applied.

If the abatement algorithm is not locally configured, it is understood by the reporting node that no overload control is performed. This is the backward compatible behavior, which means that DIAMETER_TOO_BUSY will trigger the current 3GPP Failure Handling Mechanisms (Terminate, Retry-and-Terminate, Continue), with all its limitations.

In the same way, in case "Abatement Algorithm in case of reporting node unavailability" is not configured, in case the timer Tx (which controls when the transport connection is terminated in case of no reply from OCS) expires (no reply from reporting node to a diameter request), the current 3GPP failure handling mechanism will be applied. If configured (e.g., default algorithm), then a new/modified failure handling mechanism will be applied in case of no reply from reporting node. That is, for example one of the solutions as described in the first to third embodiments may be applied as the new/modified failure handling.

It is noted also that the new/modified failure handling mechanism will be applied until it receives the indication from the reporting node that there is no more congestion (or when the OC-Validity-Duration time expires). Thereafter, the failure handling mechanism will expire and the diameter session will resume. The solution according to the present embodiment is also transparent to the new/modified failure Handling Mechanism. According to the present embodiment the conditions, the trigger and the duration for the new/modified failure Handling Mechanism will be set.

OC-Reduction-Percent is locally configured at the reacting node, e.g. according to the procedure as described in the second embodiment. It shall be noted that the solution according to the present embodiment of the invention is independent on the handling done to this parameter.

Per each diameter charging transaction (every time a CCR or ACR message shall be sent towards the diameter server), the reacting node will calculate the "OC-Validity-Duration" DOIC parameter as a random number between the OC-Min-Validity-Duration and OC-Max-Validity-Duration.

In this way the reacting node ensures that it will not trigger a massive amount of simultaneous signaling towards the reporting node. This is because in this scenario, there is no way for the reacting node to know the overload status of the reporting node.

For example, the following configuration at the reacting node is assumed:
Abatement Algorithm: Loss algorithm
Abatement Algorithm in case of reporting node unavailability: <null>
Overload-Control-Reduction-Percent: 100
Overload-Control-Min-Validity-Duration: 30 (half minute)
Overload-Control-Max-Validity-Duration: 7200 (2 hours)

If the reacting node is handing an average of 20 000 transactions per second towards the reporting node, in case of overload, the reporting node will start replying with DIAMETER_TOO_BUSY to all, some or most of the 20 000 transactions per second.

At reception of DIAMETER_TOO_BUSY in a diameter transaction, the reporting node will calculate the OC-Validity-Duration as e.g. 100 seconds (random number between the configured Min and Max values).

It will then apply the new/modified Failure Handling Mechanism during such 100 seconds. When the time expires, it will resume the diameter signaling towards the reporting node, assuming it is already not anymore in an overload situation. However if the new request (or any diameter request) is not replied (Tx expires), then the current 3GPP failure handling mechanisms will apply to the bearer (e.g., the bearer is terminated).

Figure 5A:
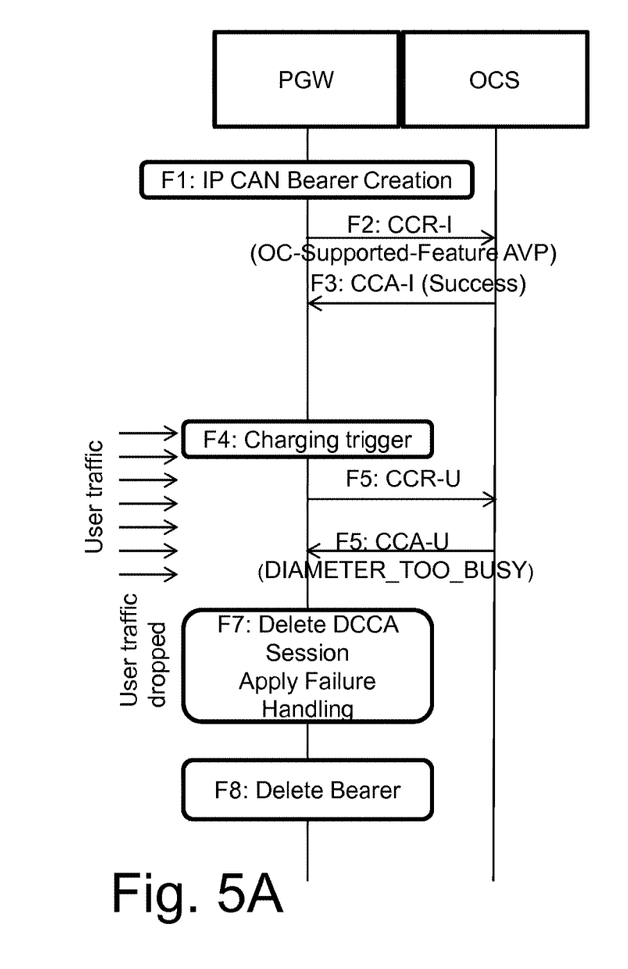
FIG. 5A shows a signaling flow between PGW and OCS according to a conventional example.
Figure 5B:
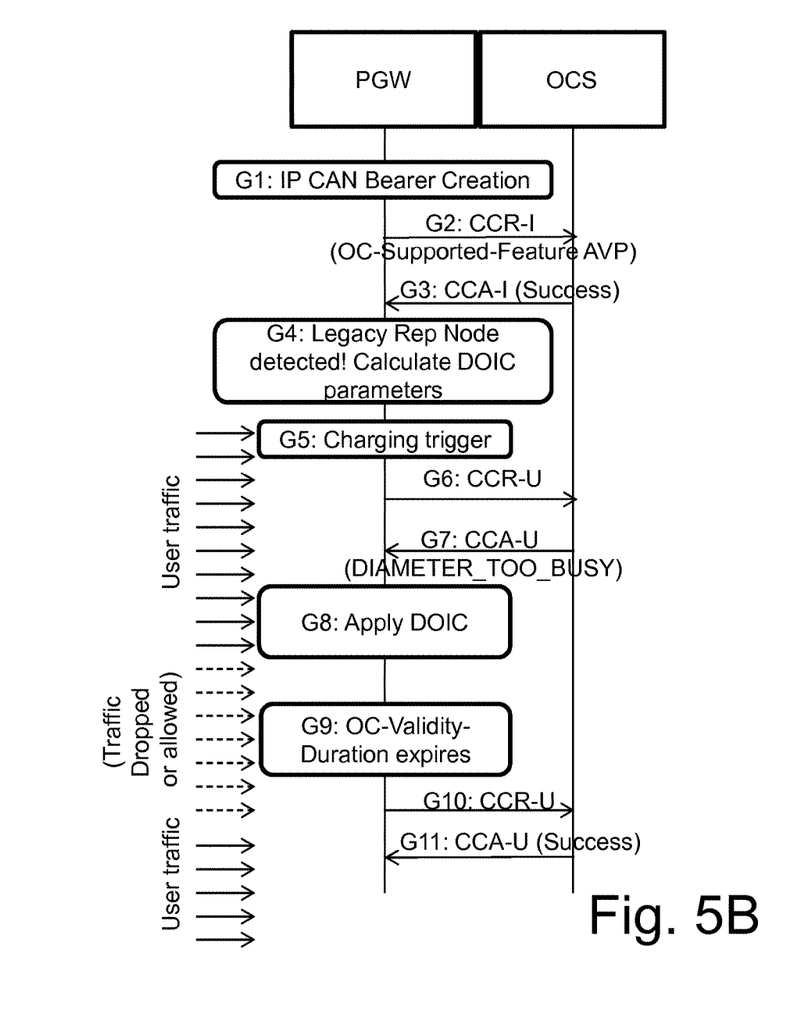
FIG. 5B shows a signaling flow between PGW and OCS according to a fourth embodiment of the present invention.

The described logic is illustrated in FIGS. 5A and 5B, which show signaling flows between a PGW as an example for a reacting node and an OCS as an example for a reporting node.

FIG. 5A shows the current behavior for DIAMETER_TOO_BUSY. In F1, an IP CAN bearer is created. In F2, the PGW sends a CCR-I including the OC-Supported-Feature AVP to the OCS, which responds with a CCA-I (SUCCESS) in F3. In F4, a request for charging trigger is received, so that in F5, the PGW sends a CCR-U to the OCS. It is now assumed that the OCS is overloaded, so that the OCS responds in F5 with a CCA-U including DIAMETER_TOO_BUSY. Hence, in F7, the PGW deletes the DCCA session and applies failure handling, and in F8, the bearer is deleted. Thus, the user traffic is dropped.

FIG. 5B shows the new behavior (DOIC triggered) according to the present embodiment.

G1 to G3 are identical to F1 to F3 in FIG. 5A. However, in G4 the PGW detects that the OCS is a legacy reporting node, since the OCS did not include the OC-Supported-Feature AVP into the CCA-I message. Hence, the PGW calculates the DOIC parameters as described above. G5 to G7 are identical to F4 to F6 of FIG. 5A. However, when the PGW now receives the CCA-U including DIAMET-ER_TOO_BUSY in G7, it applies DOIC in G8 by using the DOIC parameters calculated in G4. As mentioned above, the procedures as described in connection with the first to third embodiments may be applied until the OC-Validity-Duration expires in G9. That is, depending on the procedure applied in G8, user traffic is allowed or dropped during the OC-Validity-Duration. After expiry in G9, the DCCA session is resumed, so that user traffic is allowed again. For example, in G10, a new CCR-U may be sent to the OCS, and, in case the OCS is no longer in an overload state, the OCS responds with a CCA-U (SUCCESS).

The local configuration of the new proposed parameters at the reacting node can be configured in any of following possible levels:

At reacting node level. Same parameters apply to every transaction in the reporting node.

At charging profile level. This allows to group subscribers into different profiles, in order to allocate them more resources at the reacting node (by trying to regain diameter connectivity faster)

At APN (Access Point Name) level. Similar than the previous, but priority is given per APN (e.g. IMS APN given more priority than Web Browsing APN).

Summarizing, according to the fourth embodiment, a process is proposed for handling the issue with legacy reporting nodes that do not support DOIC. In particular, according to the fourth embodiment, reacting nodes (that do support DOIC) are enabled to other than the current "solution" of simply terminating the respective session.

A first step is to detect whether or not the reporting node is capable of using DOIC protocol. The reacting node (being capable of DOIC) will send a CCR including DOIC specific parameters (in this case the AVP "OC-Supported-Feature") to the reporting node. If the reporting node does support DOIC it will also include the "OC-Supported-Feature" AVP in its reply, if it does not support DOIC it will simply ignore the DOIC specific parameters in the received CCR (and, consequently, not include the "OC-Supported-Feature" AVP in the reply).

Furthermore, the fourth embodiment provides an improved way of handling situations where a reacting node supporting DOIC and a reporting node not supporting DOIC interact. In this case it is proposed to use pre-configured DOIC parameters in the reacting node.

Hence, the DOIC procedures (as described, for example, in the first to third embodiments) can be applied also in case the reporting node (e.g., OCS) does not support DOIC, e.g., does not send an overload report etc. when it detects that it is overloaded or congested.

Features of the above described embodiments may also be arbitrarily combined, in particular, some aspects or features of the embodiments may be combined with other aspects or features of other embodiments.

For example, the feature of determining the congested state of the diameter server (OCS) described in the second embodiment may also be applied to the other embodiments. That is, the PGW may collect several messages containing an overload report from the OCS, and only when a certain number of such messages are received, then the PGW determines that the OCS is overloaded, and may then start the OC-Validity-Duration.

Furthermore, the feature of storing the CCR messages (charging related request messages) during the OC-Validity-Duration as described in the third embodiment may also be applied to the other embodiments. For example, with respect to the first embodiment, instead of ignoring charging triggers during the OC-Validity-Duration, the CCR messages may be stored and later forwarded to the OCS.

Moreover, the feature of halting the Tx timer (a timer which controls when the transport connection is terminated in case of no reply from the OCS (charging entity)) during the PC-Validity-Duration of the third embodiment can also be applied to the other embodiments.

Moreover, the features of detecting whether a reporting node supports DOIC or is a legacy reporting node and of applying locally calculated DOIC parameters as described in the fourth embodiment can be applied to any of the first to third embodiments.

It is to be understood that any of the above modifications can be applied singly or in combination to the respective aspects and/or embodiments to which they refer, unless they are explicitly stated as excluding alternatives.

For the purpose of the present invention as described herein above, it should be noted that

- method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
    at least one processing circuitry, and
    at least one memory for storing instructions to be executed by the processing circuitry, wherein
    the at least one memory and the instructions are configured to, with the at least one processing circuitry, cause the apparatus at least:
    to control a charging control session,
    to detect an overload on the apparatus,
    to send a message including an overload report and an expected overload period to a gateway entity involved in the charging control session,
    to grant a certain quota of charged services for a subscriber, and to indicate the quota in the message, and
    to determine the quota based on the expected overload period.

2. The apparatus according to claim 1, wherein the at least one memory and the instructions are further configured to, with the at least one processing circuitry, cause the apparatus at least:
    to determine the quota based on an expected consumption of the subscriber during the expected overload period.

3. The apparatus according to claim 1, wherein the at least one memory and the instructions are further configured to, with the at least one processing circuitry, cause the apparatus at least:
    to receive, after expiry of the expected overload period, a message including a specific indication from the gateway entity,
    to receive, after expiry of the expected overload period, a message including reported consumed quota of a subscriber, and
    to charge the subscriber for the reported quota based on lowest tariff during the overload period.

4. A method for use in a charging entity, the method comprising:
    controlling a charging control session,
    detecting an overload on the charging entity,
    sending a message including an overload report and an expected overload period to a gateway entity involved in the charging control session,
    granting a certain quota of charged services for a subscriber, and indicating the quota in the message, and
    determining the quota based on the expected overload period.

5. The method according to claim 4, further comprising:
    determining the quota based on an expected consumption of the subscriber during the expected overload period.

6. The method according to claim 4, further comprising:
    receiving, after expiry of the expected overload period, a message including a specific indication from the gateway entity,
    receiving, after expiry of the expected overload period, a message including reported consumed quota of a subscriber, and
    charging the subscriber for the reported quota based on lowest tariff during the overload period.

7. A computer program product embodied on a non-transitory computer-readable medium, said product comprising code means for performing a method according to claim 4 when run on a processing means.

\* \* \* \* \*